United States Patent
Trimberger (10) Patent No.: US 7,747,025 B1
(45) Date of Patent: Jun. 29, 2010

(54) METHOD AND APPARATUS FOR MAINTAINING PRIVACY OF DATA DECRYPTION KEYS IN CONFIGURATION BITSTREAM DECRYPTION

(75) Inventor: Stephen M. Trimberger, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 1254 days.

(21) Appl. No.: 11/284,516

(22) Filed: Nov. 22, 2005

(51) Int. Cl.
*H04L 9/08* (2006.01)
(52) U.S. Cl. ...................................... 380/284
(58) Field of Classification Search .................. 380/284
See application file for complete search history.

(56) References Cited

U.S. PATENT DOCUMENTS

| 6,118,869 | A | 9/2000 | Kelem et al. |
| 6,366,117 | B1 * | 4/2002 | Pang et al. ................. 326/38 |
| 6,904,527 | B1 * | 6/2005 | Parlour et al. ............. 713/189 |
| 6,931,543 | B1 | 8/2005 | Pang et al. |

FOREIGN PATENT DOCUMENTS

GB 2 375 418 B 6/2004

OTHER PUBLICATIONS

U.S. Appl. No. 10/112,838, filed Mar. 29, 2002, Trimberger.
U.S. Appl. No. 10/714,380, filed Oct. 21, 2003, Trimberger.
U.S. Appl. No. 10/112,790, filed Mar. 29, 2002, Trimberger.

* cited by examiner

*Primary Examiner*—Kambiz Zand
*Assistant Examiner*—Aubrey H Wyszynski
(74) *Attorney, Agent, or Firm*—LeRoy D. Maunu; John J. King (57) ABSTRACT

Decryptor is utilized in a dual role to maintain privacy of data decryption keys used in configuration bitstream decryption. In a first role, decryptor receives a data decryption key in an encrypted format (ENCRYPTED KEY DATA), which is then decrypted using a mask programmed decryption key. The decrypted key is then stored into one or more of key storage blocks. In a second role, decryptor is utilized to decrypt the encrypted configuration bitstream (ENCRYPTED CONFIGURATION DATA) using the previously decrypted data decryption key.

18 Claims, 4 Drawing Sheets

METHOD AND APPARATUS FOR MAINTAINING PRIVACY OF DATA DECRYPTION KEYS IN CONFIGURATION BITSTREAM DECRYPTION

FIELD OF THE INVENTION

The present invention generally relates to programmable logic devices (PLDs), and more particularly to the protection of data decryption keys used by the PLDs to decrypt the encrypted configuration bitstream.

BACKGROUND

PLDs are a well-known type of integrated circuit that may be programmed to perform specified logic functions. One type of PLD, the Field Programmable Gate Array (FPGA), typically includes an array of programmable tiles. These programmable tiles can include, for example, Input/Output Blocks (IOBs), Configurable Logic Blocks (CLBs), dedicated Random Access Memory Blocks (BRAM), multipliers, Digital Signal Processing blocks (DSPs), processors, clock managers, Delay Lock Loops (DLLs), Multi-Gigabit Transceivers (MGTs) and so forth.

Each programmable tile typically includes both programmable interconnect and programmable logic. The programmable interconnect typically includes a large number of interconnect lines of varying lengths interconnected by Programmable Interconnect Points (PIPs). The programmable logic implements the logic of a user design using programmable elements that may include, for example, function generators, registers, arithmetic logic, and so forth.

The programmable interconnect and the programmable logic are typically programmed by loading a stream of configuration data into internal configuration memory cells that define how the programmable elements are configured. The configuration data may be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to Input/Output (I/O) resources by an interconnect switch matrix. Each function block of the CPLD includes a two-level AND/OR structure similar to those used in Programmable Logic Arrays (PLAs) and Programmable Array Logic (PAL) devices. In some CPLDs, configuration data is stored on-chip in non-volatile memory. In other CPLDs, configuration data is stored on-chip in non-volatile memory, then downloaded to volatile memory as part of an initial configuration sequence.

For all of these PLDs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Some PLDs, such as the Xilinx Virtex® FPGA, can be programmed to incorporate blocks with pre-designed functionalities, i.e., "cores". A core can include a predetermined set of configuration bits that program the FPGA to perform one or more functions. Alternatively, a core can include source code or schematics that describe the logic and connectivity of a design. Typical cores can provide, but are not limited to, DSP functions, memories, storage elements, and math functions. Some cores include an optimally floor planned layout targeted to a specific family of FPGAs. Cores can also be parameterizable, i.e., allowing the user to enter parameters to activate or change certain core functionality.

The configuration bitstream used to configure today's PLDs may either be transmitted in the clear, i.e., non-encrypted, or conversely, it may be transmitted to the PLD in an encrypted format. Regardless of the encryption state of the configuration bitstream, decryption keys may nevertheless be stored within the PLD during key access mode. Should the decryption keys be transmitted to the PLD in the clear during key access mode, a possibility exists that an unintended recipient may gain control of the data decryption keys. After the data decryption keys have been stored, a further possibility exists that the data decryption keys can be accessed by an unauthorized entity and subsequently used to decrypt highly valuable encrypted configuration bitstreams.

Public key methods are a well known form of data decryption key protection, whereby data decryption keys may be encrypted prior to transmission without risk of unauthorized access. Public-key methods, however, require large blocks of logic and may add a significant amount of time to the PLD configuration process. Accordingly, substantial execution time and semiconductor die area penalties may result from the use of the public-key methods to protect data decryption keys and other sensitive data within the PLD. Accordingly, efforts continue to enhance methods for data decryption key protection without the need for additional logic and execution time.

SUMMARY

To overcome limitations in the prior art, and to overcome other limitations that will become apparent upon reading and understanding the present specification, various embodiments of the present invention disclose an apparatus and method for the reuse of existing programmable logic device (PLD) logic to maintain privacy of decryption keys in configuration bitstream decryption.

In accordance with one embodiment of the invention, a method of protecting data comprises encrypting a data decryption key using a secret encryption key such as a mask programmable key, transmitting the encrypted data decryption key to a programmable device, decrypting the data decryption key received by the programmable device using a decryptor and a secret decryption key (which optionally is the same as the secret encryption key) stored on-board the programmable device, encrypting a configuration bitstream, transmitting the configuration bitstream to the programmable device, and decrypting the configuration bitstream using the decryptor and the decrypted data decryption key.

In accordance with another embodiment of the invention, an integrated circuit (IC) comprises a multiplexer that is coupled to receive an encrypted data decryption key and encrypted configuration data and is adapted to selectively provide the encrypted data decryption key and the encrypted configuration data to an output of the multiplexer. The IC further comprises a decryption key storage block that is coupled to receive a mask programmed key and is adapted to provide the mask programmed key in response to an address signal. The IC further comprises a decryptor that is coupled to an output of the multiplexer and to an output of the decryption key storage block. The decryptor is adapted to decrypt the encrypted data decryption key using the mask programmed key and is further adapted to decrypt the encrypted configuration data using the decrypted data decryption key.

In accordance with another embodiment of the invention, a programmable logic device (PLD) configuration system comprises a configuration device that is adapted to provide an encrypted data decryption key. The configuration device includes a configuration bitstream generator that is adapted to provide a mask programmed key and a data decryption key. The configuration device further includes an encryptor that is coupled to receive the mask programmed key and the data decryption key and is adapted to encrypt the data decryption key using the mask programmed key. The PLD configuration system further comprises a PLD that is coupled to receive the encrypted data decryption key. The PLD includes a first storage block that is adapted to store the mask programmed key and a decryptor that is coupled to the storage block and is adapted to decrypt the encrypted data decryption key using the mask programmed key.

BRIEF DESCRIPTION OF THE DRAWINGS

Various aspects and advantages of the invention will become apparent upon review of the following detailed description and upon reference to the drawings in which.

DETAILED DESCRIPTION

Generally, various embodiments of the present invention provide methods and apparatus for the protection of data decryption keys used in the decryption of encrypted configuration bitstreams. The configuration bitstream may be delivered to an integrated circuit, such as a programmable logic device (PLD), in either of a non-encrypted, or encrypted format. If delivered in an encrypted format, the configuration bitstream is decrypted using an on-board decryptor through the use of locally stored data decryption keys. If delivered in a non-encrypted format, on the other hand, the on-board decryptor is bypassed and the configuration bitstream is loaded directly into the configuration memory cells of the PLD.

Regardless of the encryption state of the configuration bitstream, however, data decryption keys may nevertheless be stored within the PLD. In one embodiment, battery-backed random access memory (RAM) is used to store the data decryption keys within the PLD. Through the use of battery-backed RAM, for example, security may be enhanced by allowing removal of the battery from the RAM once PLD tampering is detected. In such an instance, passive zeroization is used to clear the data decryption keys from the RAM, since removal of the battery power causes the stored decryption keys to "bleed" via memory content leakage.

Other data decryption key storage embodiments are also available to enhance data decryption key protection. For example, mask programmed key storage is provided, whereby during manufacture of the PLD, keys are programmed into non-volatile memory locations, e.g., read only memory (ROM), within the PLD. The on-board decryptor may then recall the mask programmed keys from the ROM locations during the PLD configuration state when configuration bitstream decryption is required.

In an alternate embodiment, programmable fuses (eFUSEs) may be used, whereby a sufficient number of eFUSE cells are programmed to store the key. The logic value of each bit of a key may be programmed into each eFUSE using a relatively high current to "short" the eFUSE to its programmed logic state. Still other storage solutions, such as laser fuse technology, may be utilized to store the keys prior to packaging.

Key storage solutions, such as the eFUSE and battery-backed RAM discussed above, typically require the keys to be stored after the manufacturing phase of the PLD. Thus, in these instances, the keys may be required to be delivered to the manufacturer of the system containing the PLD for programming. In order to preclude the necessity of providing unprotected keys to the manufacturer, therefore, the keys themselves may be encrypted prior to delivery to the manufacturer. Encryption of the keys may also prove useful for all other key storage, since added security is provided by encrypting the keys prior to storage.

Some PLDs come equipped with an on-board decryptor, which is used to decrypt the encrypted configuration bitstream received by the PLD. In alternate embodiments, the on-board decryptor may also be used in a different capacity, thus allowing the decryptor to be used in a dual capacity. In particular, the on-board decryptor may be used to decrypt the data decryption keys in the event that the data decryption keys are first encrypted prior to storage, or in the event that the data decryption keys are encrypted during key access mode. Thus, during the configuration phase of PLD operation, a PLD in receipt of an encrypted configuration bitstream first decrypts the locally stored data decryption keys using the on-board decryptor. Once the data decryption keys are decrypted, they may then be used to decrypt the encrypted configuration bitstream using the same on-board decryptor that was used to decrypt the data decryption keys.

Figure 1:
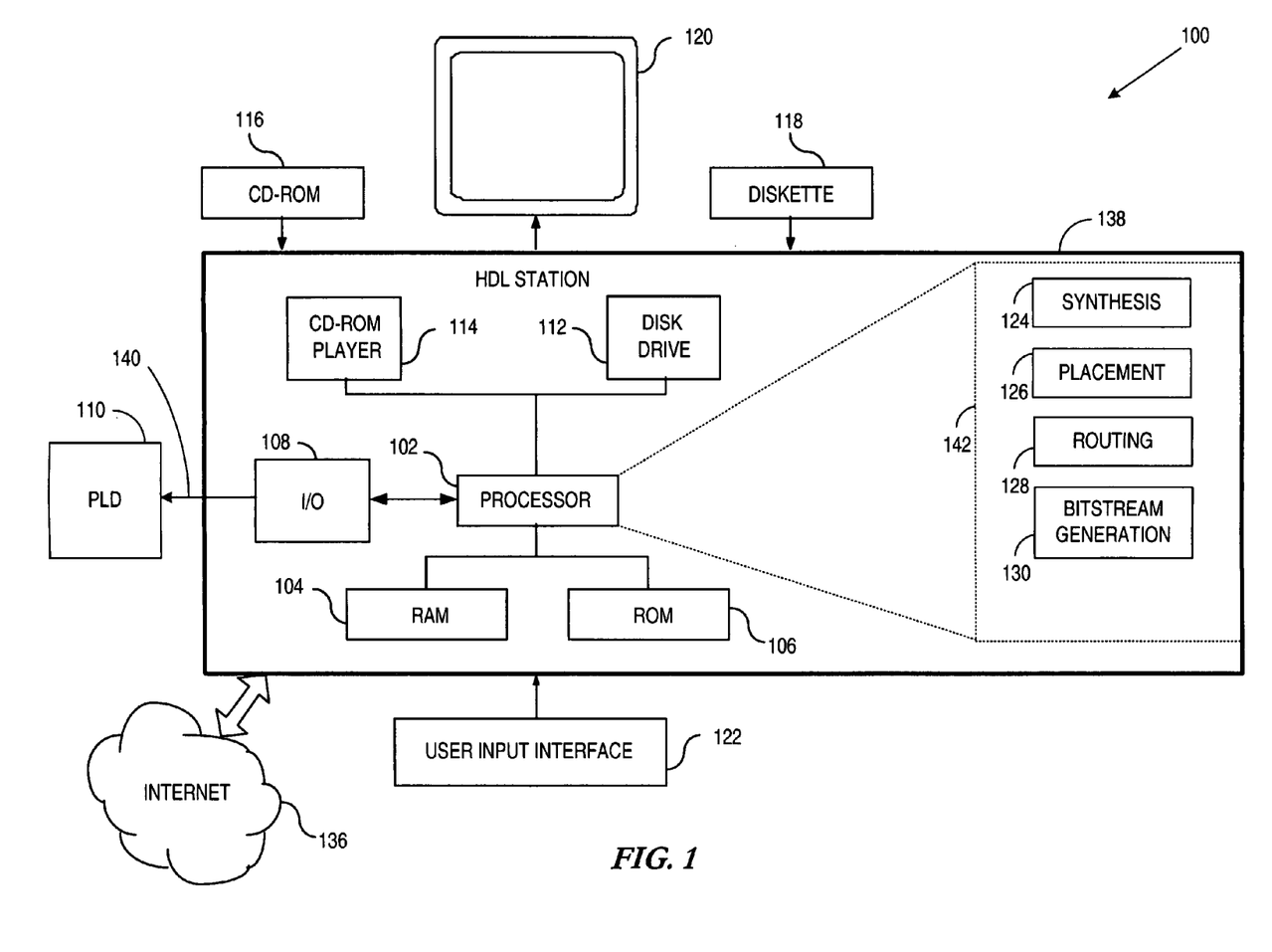
FIG. 1 illustrates an exemplary hardware description language (HDL) development station.

Turning to FIG. 1, a block diagram of a hardware design language (HDL) workstation is exemplified, whereby HDL station 138 generates a configuration bitstream and transmits the configuration bitstream 140 to PLD 110 during a configuration phase of PLD 110. Verilog and VHDL represent two of the more popular HDL languages in use today, which may be used to define the structure of a PLD based design. In particular, HDL facilitates a description of the manner in which a design is decomposed into sub-blocks of logic resources and further allows a description of the manner in which each sub-block of the design is to be interconnected.

The exemplary computing arrangement that is suitable for performing HDL definition activities includes HDL station 138, which further includes a central processor (CPU) 102 coupled to random access memory (RAM) 104 and read-only memory (ROM) 106. The ROM 106 may also be implemented using other types of storage media to store programs, such as programmable ROM (PROM), electronically erasable PROM (EEPROM), etc. The processor 102 may communicate with other internal and external components through input/output (I/O) circuitry 108 to provide, for example, configuration bitstream 140 to PLD 110.

HDL station 138 may also include one or more data storage devices, including hard and floppy disk drives 112, CD-ROM drives 114, and other hardware capable of reading and/or storing information, such as DVD, etc. Software for facilitating the HDL implementation of a reconfigurable design may be stored and distributed on a CD-ROM 116, diskette 118 or other form of media capable of portably storing information. These storage media may be inserted into, and read by, devices such as the CD-ROM drive 114, the disk drive 112, etc.

The software for facilitating the HDL definitions may also be transmitted to HDL station 138 via data signals, such as being downloaded electronically via a network, such as Internet 136. HDL station 138 is coupled to a display 120, which may be any type of known display or presentation screen, such as LCD displays, plasma display, cathode ray tubes (CRT), etc. A user input interface 122 is provided, including one or more user interface mechanisms such as a mouse, keyboard, microphone, touch pad, touch screen, voice-recognition system, etc.

Processor 102 may be used to execute integrated software environment (ISE) 142 in order to aid the synthesis 124, placement 126, and routing 128 of the hardware definitions extracted from the HDL files. Once the design is synthesized, placed, and routed, configuration bitstream 140 is generated by bitstream generation block 130 and transmitted to PLD 110.

Also included within bitstream generation block 130, is the capability to encrypt configuration bitstream 140 prior to transmission. Bitstream generation block 130 uses, for example, an encryption system that is based on the advanced encryption standard (AES). In one embodiment, bitstream generation block 130 may encrypt blocks of data, e.g., 128-bit blocks of data, using a 256-bit encryption key, which is also used by PLD 110 to decrypt each 128-bit block of configuration data received. Furthermore, bitstream generation block 130 may encrypt the 256-bit encryption key itself and program the encrypted key into PLD 110 during key access mode as discussed in more detail below.

Figure 2:
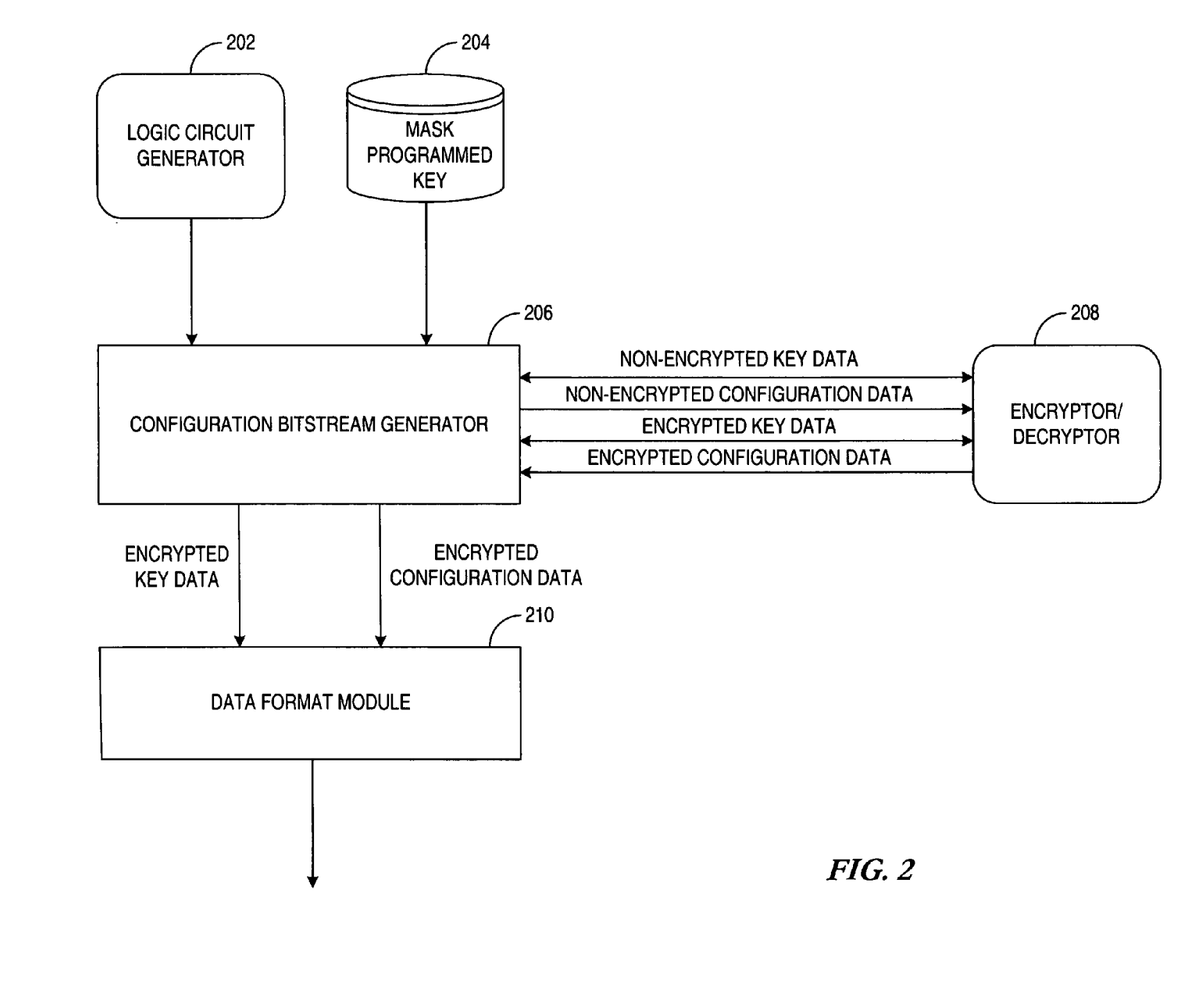
FIG. 2 illustrates an exemplary configuration bitstream security block diagram of the HDL development station of FIG. 1.

Turning to FIG. 2, an exemplary configuration bitstream security block diagram of HDL development station 138 is illustrated. Logic circuit generator 202 may represent the synthesis 124, placement 126, and routing 128 blocks of ISE block 142, which provides a fully routed native circuit description (NCD) file to configuration bitstream generator 206. The NCD file contains all of the configuration information that is necessary to define the internal logic and interconnections of PLD 110. Configuration bitstream generator 206 may then receive the NCD file from logic circuit generator 202 and combine it with other files (not shown) which provide device-specific information that may be associated with PLD 110. The NCD file and device-specific information is then combined to form a configuration bitstream, which when downloaded to PLD 110 during a configuration phase, is effective to configure PLD 110 to function in accordance with a particular logic function.

Configuration bitstream generator 206 may also encrypt the configuration bitstream using a data encryption key in accordance with an encryption standard, such as the AES as discussed above. In one embodiment, the data decryption key is provided by the user of the hardware design workstation. In another embodiment, the data decryption key is embedded within configuration bitstream generator 206, or provided to configuration bitstream generator 206 externally. Regardless of the source, the data decryption key may be provided to configuration bitstream generator 206 in encrypted form and decrypted before use.

Configuration bitstream generator 206 may also encrypt the data decryption key in accordance with an encryption standard, such as the AES. In one embodiment, the mask programmed key used to encrypt the data decryption key may be embedded within configuration bitstream generator 206. In another embodiment, mask programmed key file 204 may be provided to configuration bitstream generator 206 externally. The mask programmed key provided by mask programmed key file 204 may also be encrypted for further security.

In some embodiments, the mask programmed key and the data decryption key are provided to encryptor 208, so that encryptor 208 may encrypt the data decryption key using the mask programmed key. In some embodiments, the data decryption key and the configuration bitstream data are provided to encryptor 208 for encryption of the configuration bitstream in accordance with the encryption standard being utilized.

As discussed in more detail below, the data decryption key is also transmitted to the PLD in either a singly or doubly encrypted format. In the case of double encryption, the data decryption key may be submitted to encryptor 208 twice, such that the data decryption key undergoes two applications of encryption. Three or more encryption applications may also be implemented for additional security.

Both the encrypted data decryption key and the encrypted configuration bitstream may then be provided to data format module 210 to be formatted in accordance with the particular configuration system being used. In one embodiment, a serial configuration system may be selected, in which the encrypted configuration bitstream is delivered to PLD 110 via a serial data bus. The serial data may be clocked into PLD 110 via a clock signal generated by data format module 210, i.e., slave mode, or conversely, may be clocked into PLD 110 via a clock signal generated by PLD 110, i.e., master mode. Alternatively, a parallel bus may be used in either master or slave mode to configure PLD 110.

In other embodiments, data format module 210 may format the encrypted configuration data into a programmable read-only memory (PROM) format. In this instance, the configuration bitstream may first be configured for PROM storage by inserting address and checksum information and subsequently accessed by microprocessors and/or PROM access devices for custom PLD configurations.

In one embodiment, data format module 210 may support the IEEE 1532 standard for In-System Configuration (ISC), which is based upon the IEEE 1149.1 standard. The IEEE 1149.1 standard defines the Test Access Port (TAP) and Boundary Scan architecture that is commonly referred to as a Joint Test Action Group (JTAG) architecture.

The JTAG architecture may be used to separately configure PLD 110 with a data decryption key and an encrypted configuration bitstream. The data decryption key may be programmed into PLD 110 during the key access mode using the ISC_PROGRAM instruction as detailed in the IEEE 1532 specification. Upon entering the key access mode, all PLD memory, including the previously stored data decryption key and configuration memory, is cleared. Thus, the PLD keys are unable to be set without first clearing the entire device.

In one embodiment, data decryption keys received during the key access mode may be decrypted prior to storage within the PLD. In such an instance, mask programmed keys internal to the PLD, which have been predetermined to match the mask programmed keys used in configuration bitstream generator 206, are used to decrypt the data decryption keys. In another embodiment, data decryption keys may be stored in encrypted form and decrypted using mask programmed keys that match those used in configuration bitstream generator 206, when the data decryption keys are needed to decrypt a configuration bitstream. After being configured with a data decryption key, PLD 110 may be configured with an encrypted configuration bitstream using any configuration bitstream formatting. PLD 110 may then use the data decryption key to decrypt the configuration bitstream in accordance with the encryption standard being utilized.

Figure 3:
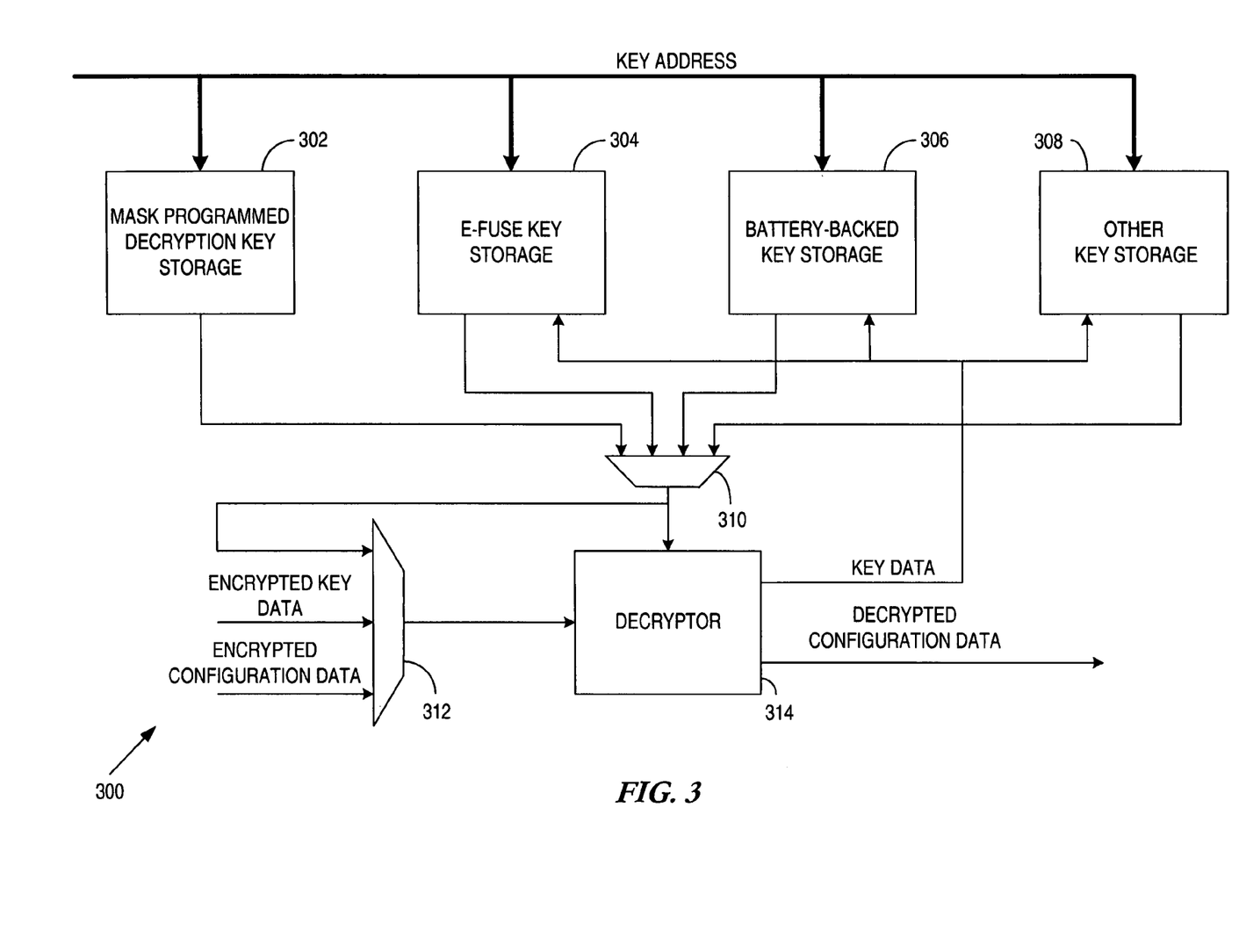
FIG. 3 illustrates an exemplary configuration bitstream decryption block diagram of an integrated circuit (IC)

Turning to FIG. 3, an exemplary configuration bitstream decryption block diagram is provided, which illustrates various decryption key storage options that may be available within PLD 110. It should be noted that the storage options exemplified in FIG. 3 may be used both for the mask programmed key(s) and for the data decryption key(s). In a first embodiment, one or more keys may be mask programmed into storage block 302 during PLD manufacturing. In particular, the keys may be "hard-wired" into ROM based memory, whereby through adequate selection of signal KEY ADDRESS, the key may be accessed and presented to multiplexer 310 for further processing by decryptor 314.

In an alternate embodiment, eFUSE storage block 304 may be used to provide non-volatile key storage. Each bit of each key may be programmed into eFUSE key storage block 304 after, or during, PLD manufacturing using a relatively high current to "short" the corresponding eFUSEs to their programmed logic state. As such, the programmed logic state of each eFUSE may then be accessed through appropriate selection of signal KEY ADDRESS and supplied to decryptor 314 via multiplexer 310 for further processing. Alternate non-volatile storage block 308 may also be used to provide similar functionality. For example, other key storage block 308 may contain laser programmable fuses, or electrically erasable PROM (EEPROM) devices, which are similarly accessible by decryptor 314 through adequate selection of signal KEY ADDRESS and multiplexer 310.

In an alternate embodiment, battery-backed RAM storage 306 may be used to store the keys within the PLD. Through the use of battery-backed RAM, for example, security may be enhanced by allowing removal of the battery from the RAM once PLD tampering is detected. In such an instance, passive zeroization is used to clear the keys from the RAM, since removal of the battery power causes the stored keys to eventually bleed away.

In one mode of operation, bitstream decryption block diagram 300 receives mask programmed keys during the PLD manufacturing process, which may be stored within any one or more of storage blocks 302-308. During key access mode, the encrypted data decryption keys are received via signal ENCRYPTED KEY DATA, which is then selected by multiplexer 312 for subsequent delivery to on-board decryptor 314.

Signal ENCRYPTED KEY DATA may then be decrypted by decryptor 314 once the pre-programmed mask programmed keys have been recalled from one of decryption key storage blocks 302-308. That is to say, for example, that appropriate selection of signal KEY ADDRESS and multiplexer 310 is effective to deliver the mask programmed keys to decryptor 314, so that signal ENCRYPTED KEY DATA may be decrypted. Once decrypted, the key data stored within storage blocks 304-308 may then be updated by decryptor 314 by programming the decrypted data decryption keys via signal KEY DATA and appropriate selection of signal KEY ADDRESS.

Thus in one embodiment, data decryption key decryption is performed using mask programmed keys that have been pre-programmed into the PLD during the manufacturing process. The decrypted data decryption keys may then be written to one of key storage blocks 304-308 via signal KEY DATA for future access. Subsequent data decryption key decryption and/or configuration bitstream decryption may then be performed by accessing data decryption keys from any one of key storage blocks 304-308. In this way, security may be enhanced by alternating the source of the decryption keys when decryption of an encrypted configuration bitstream or data decryption key is required.

Further security enhancements may be implemented through the use of multiple encryption applications of the key data. That is to say, for example, that the data decryption keys may be doubly encrypted by HDL workstation 138 of FIG. 1 before transmission to multiplexer 312 during key access mode. In such an instance, signal ENCRYPTED KEY DATA received by multiplexer 312 represents a doubly encrypted data decryption key, which may then be decrypted once by decryptor 314 as discussed above. Signal KEY DATA may then be programmed into one of storage blocks 304-308, whereby signal KEY DATA represents a singly encrypted data decryption key. Allowing storage of singly encrypted data decryption keys enhances security, especially when eFUSEs are used for key storage, since eFUSE contents may be readily obtained through microscope inspection. As discussed above, numerous encryption applications, e.g., triple or quadruple, may be used to further enhance security.

During the configuration phase of PLD 110, the singly encrypted data decryption keys must first be recalled from one of key storage blocks 304-308 and routed through multiplexers 310 and 312 to decryptor 314 for a second decryption application using mask programmed keys from storage block 302. Once doubly decrypted, the keys are then available to decryptor 314 for decryption of the encrypted configuration bitstream received and delivered to decryptor 314 by multiplexer 312. Since more than one mask programmed key may exist within storage 302, double decryption may be implemented using two different mask programmed keys as selected by signal KEY ADDRESS.

Dual utilization roles of decryptor 314 are thus illustrated. In a first role, decryptor 314 is assigned the task of decrypting data decryption keys received from HDL workstation 138 during key access mode via key access path 140. In a second role, decryptor 314 is further assigned the task of decrypting the configuration bitstream received from HDL workstation (or some other configuration device such as a PROM) using the data decryption keys received during key access mode.

Decryptor 314 and the mask programmed keys within PLD 110 may be described as implementing a one-way security function. In other words, the keys are encrypted by a one-way function, e.g., P, such that $P(x)=p$, where x is the key data itself and p is the encrypted form of the key data. In order to be a one-way function, $P(x)$ must be difficult to invert, i.e., it must be computationally infeasible to find some input, y, such that $P(y)$ is also equal to p.

Thus, other forms of key security may be implemented using similar one-way functions. In particular, a hash function, $H(x)$, may be used to compute the hash, h, of the key data, x. The hash, also known as the message digest, may then be transmitted to PLD 110 and stored within one of storage blocks 304-308 for future reference. Once needed, the inverse of the hash may be computed to reveal the data decryption keys for decryption processing by decryptor 314 as discussed above.

In order to further enhance security, encryptor 208 of FIG. 2 may implement cipher block chaining (CBC). In particular, the key data may be block ciphered, such that a cryptographic key and algorithm are applied to the key data as a group of bits, instead of one bit at a time. CBC uses an initialization vector (IV) of a certain length, e.g., 256 bits, whereby a chaining mechanism is created that requires decryptor 314 to decrypt a block of cipher text in dependence of all the previously decrypted cipher text blocks. As a result, the entire validity of all preceding cipher text blocks is contained in the immediately subsequent cipher text block. In this instance, a longer sequence, e.g., 512 bits, is required to be programmed into PLD 110 during key access mode to transmit both the key data and the IV.

Figure 4:
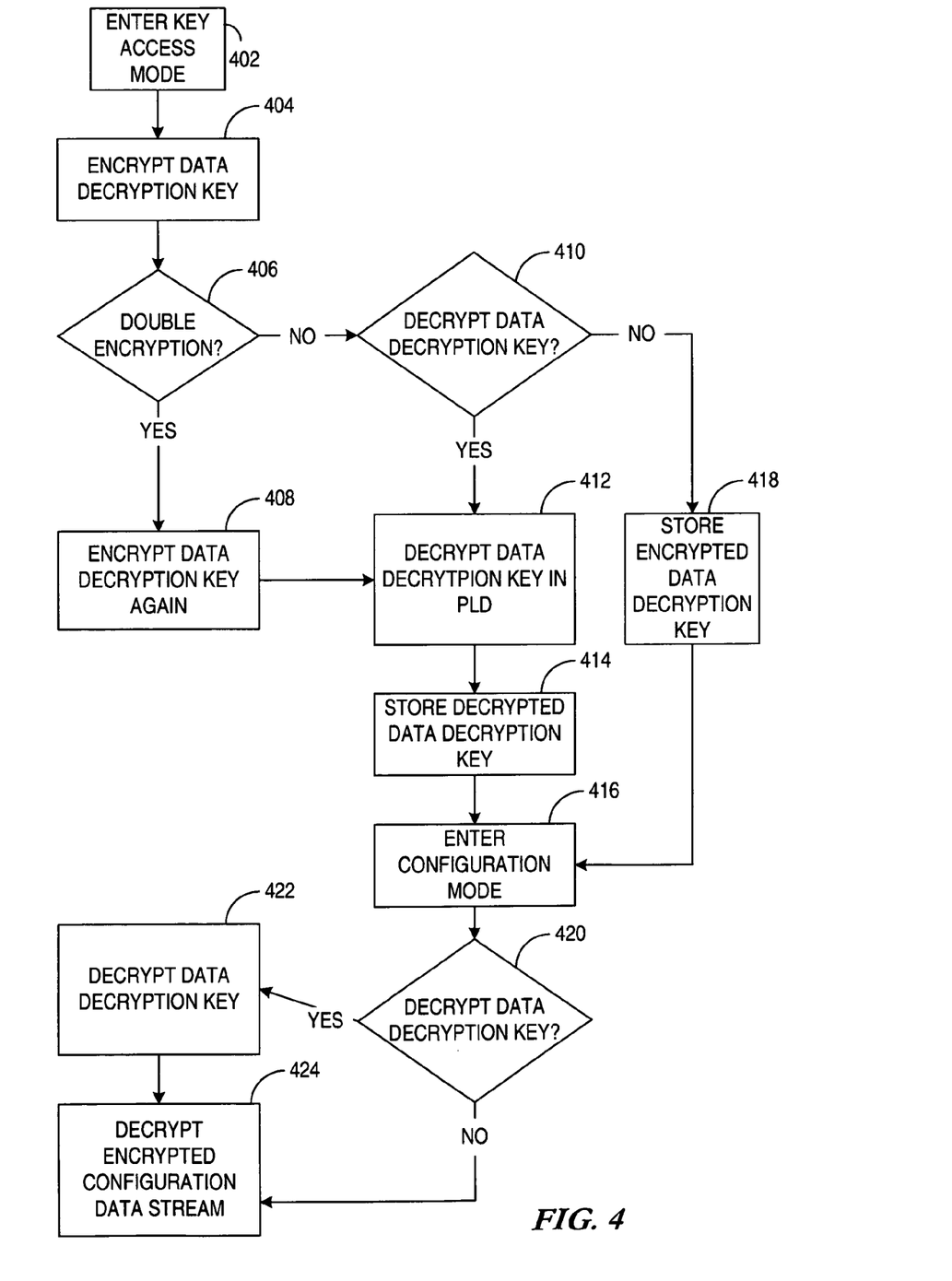
FIG. 4 illustrates an exemplary flow diagram of a decryption key protection method.

Turning to FIG. 4, a method of decryption key protection is exemplified, in which execution steps 402-408 may be executed by HDL workstation 138 and steps 410-424 may be executed by the integrated circuit, e.g., PLD 110, being programmed. In step 402, key access mode is entered, in which the data decryption key may be programmed into PLD 110 using the ISC_PROGRAM instruction as detailed in the IEEE 1532 specification.

Prior to programming, however, step 404 is executed by encryptor 208 of FIG. 2 to encrypt the data decryption key using a mask programmed key a copy of which is stored in within storage block 302 of FIG. 3. Should double encryption be required as determined in step 406, the singly encrypted data decryption key may be re-submitted to encryptor 208 in step 408 by configuration bitstream generator 206 for a second encryption application, using for example, a different mask programmed key.

Alternately, if the key is already supplied in encrypted format by mask programmed key file 204 and double encryption is required, then configuration bitstream generator 206 may submit the encrypted key to encryptor 208 for a single application of encryption to achieve the required result. It should be noted that step 408 may be repeated multiple times using different mask programmed keys to achieve the desired number of encryption applications.

Once appropriate encryption is applied to the data decryption keys, they may be supplied to PLD 110 via key access mode, in which the data decryption keys may first be decrypted, the need for which being determined in step 410. If data decryption key decryption is desired, then decryptor 314 is invoked as in step 412 using the mask programmed key contained within storage block 302 of FIG. 3. Once decrypted, the key access mode may be completed by storing the decrypted data decryption keys into one or more of storage blocks 304-308 of FIG. 3 as in step 414. Alternately, decryption of the data decryption key may not be desired as determined in step 410. As such, the data decryption keys received during key access mode are stored directly as in step 418.

In step 416, a configuration phase of PLD 110 is entered, in which HDL workstation transmits an encrypted configuration bitstream to PLD 110. If the data decryption keys are stored within PLD in an encrypted format, as determined by step 420, then the data decryption key must be decrypted by decryptor 314 as in step 422. Once fully decrypted, the data decryption key may finally be utilized by decryptor 314 to decrypt the encrypted configuration bitstream as in step 424. It should be noted, that step 422 may be repeated to remove all encryption applications as implemented by step 408.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of protecting data, comprising:
   encrypting a data decryption key using a secret encryption key;
   encrypting configuration data;
   coupling the encrypted data decryption key and the encrypted configuration data to a data format module;
   formatting, in the data format module, the encrypted data decryption key and the encrypted configuration data according to a predetermined format as a configuration bitstream;
   transmitting the configuration bitstream to a programmable logic device;
   decrypting the encrypted data decryption key received by the programmable logic device using a decryptor and a secret decryption key stored on-board the programmable logic device; and
   decrypting the encrypted configuration data using the decryptor and the decrypted data decryption key wherein the secret encryption key or the secret decryption key is a mask programmed key.

2. The method of claim 1, wherein the secret encryption key and secret decryption key are the same, and wherein the secret encryption and decryption keys are the mask programmed key.

3. The method of claim 2, wherein encrypting the data decryption key using the mask programmed key comprises retrieving the mask programmed key from a configuration bit stream generator.

4. The method of claim 2, wherein encrypting the data decryption key using the mask programmed key comprises retrieving the mask programmed key from a mask programmed key file.

5. The method of claim 1, wherein encrypting the data decryption key comprises encrypting the data decryption key more than once using a different mask programmed key for each encryption.

6. The method of claim 1, wherein the decrypted data decryption key is stored within at least one eFUSE of the programmable logic device.

7. The method of claim 1, wherein the decrypted data decryption key is stored within at least one random access memory (RAM) of the programmable logic device.

8. The method of claim 5, wherein decrypting the data decryption key received by the programmable logic device comprises recalling a plurality of mask programmed keys internally stored within the programmable logic device, wherein each one of the mask programmed keys internally stored within the programmable device matches a corresponding mask programmed key used for encryption.

9. A programmable logic device (PLD), comprising:
   an input coupled to receive a configuration bitstream;
   a first multiplexer coupled to receive an encrypted data decryption key and encrypted configuration data from the configuration bitstream and adapted to selectively provide the encrypted data decryption key and the encrypted configuration data to an output of the first multiplexer;
   a first key storage block coupled to receive a mask programmed key and adapted to provide the mask programmed key in response to an address signal;
   a decryptor coupled to an output of the first multiplexer and to an output of the first key storage block, wherein the decryptor is adapted to decrypt the encrypted data decryption key using the mask programmed key and is further adapted to decrypt the encrypted configuration data using the decrypted data decryption key;
   a second key storage block coupled to the output of the decryptor, wherein the decrypted data decryption key is stored in the second key storage block; and
   a second multiplexer having a first input coupled to the first key storage block and a second input coupled to the second key storage block, wherein the second multiplexer selects the mask programmed key from the first key storage block when decrypting the encrypted data decryption key and selects the decrypted data decryption key from the second key storage block when decrypting the encrypted configuration data.

10. The IC of claim 9, wherein the mask programmed key is stored during a manufacturing phase of the IC.

11. The IC of claim 9, further comprising multiple storage blocks including the second key storage block coupled to the decryptor, the multiple storage blocks being adapted to store the decrypted data decryption key received from the decryptor.

12. The IC of claim 11, wherein the multiple storage blocks comprises an eFUSE storage block.

13. The IC of claim 11, wherein the multiple storage blocks comprises a random access memory (RAM) storage block.

14. A programmable logic device (PLD) configuration system comprising:
- a configuration device adapted to provide an encrypted data decryption key, the configuration device including,
  - a configuration bitstream generator adapted to provide a mask programmed key and a data decryption key; and
  - an encryptor coupled to receive the mask programmed key and the data decryption key and adapted to encrypt the data decryption key using the mask programmed key;
- a data format module coupled to the encryptor to format the encrypted data decryption key and encrypted configuration data according to a predetermined format as a configuration bitstream; and
- the programmable logic device coupled to receive the encrypted data decryption key and the encrypted configuration data in the configuration bitstream, the programmable logic device including,
  - a first storage block adapted to store the mask programmed key; and
  - a decryptor coupled to the first storage block and adapted to decrypt the encrypted data decryption key using the mask programmed key.

15. The programmable logic device configuration system of claim 14, wherein the configuration device further comprises a logic circuit generator coupled to the configuration bitstream generator, the logic circuit generator adapted to provide a circuit description to the configuration bitstream generator.

16. The programmable logic device configuration system of claim 15, wherein the configuration bitstream generator is adapted to provide the circuit description to the encryptor, the encryptor being adapted to encrypt the circuit description using the data decryption key and further adapted to provide the encrypted circuit description to the configuration bitstream generator.

17. The programmable logic device configuration system of claim 16, wherein the decryptor is further coupled to receive the encrypted circuit description from the configuration device and adapted to decrypt the encrypted circuit description using the decrypted data decryption key.

18. The programmable logic device configuration system of claim 17, wherein the programmable logic device further comprises a second storage block coupled to the decryptor and adapted to store the decrypted data decryption key.

* * * * *